(12) United States Patent
Tam et al.

(10) Patent No.: US 11,381,441 B2
(45) Date of Patent: Jul. 5, 2022

(54) DISPERSION COMPENSATION IN MM-WAVE COMMUNICATION OVER PLASTIC WAVEGUIDE USING OFDM

(71) Applicant: NXP USA, Inc., Austin, TX (US)

(72) Inventors: Sai-Wang Tam, Sunnyvale, CA (US); Su Chenxin, Seattle, WA (US); Vijay Ahirwar, Pune (IN); Rulin Huang, Los Angeles, CA (US); Alden C. Wong, Sunnyvale, CA (US); Rui Cao, Fremont, CA (US); Sudhir Srinivasa, Los Gatos, CA (US); Alireza Razzaghi, Mountain View, CA (US); Randy Tsang, San Carlos, CA (US); Timothy J. Donovan, Livermore, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/527,109

(22) Filed: Jul. 31, 2019

(65) Prior Publication Data
US 2020/0169444 A1 May 28, 2020

Related U.S. Application Data

(60) Provisional application No. 62/772,451, filed on Nov. 28, 2018.

(51) Int. Cl.
*H04L 27/26* (2006.01)
*H04L 25/03* (2006.01)

(52) U.S. Cl.
CPC .... *H04L 27/2627* (2013.01); *H04L 25/03019* (2013.01); *H04L 27/2607* (2013.01); *H04L 2025/03356* (2013.01)

(58) Field of Classification Search
CPC ..... H04B 3/52; H04L 27/2636; H04L 5/0007; H04W 72/0453
See application file for complete search history.

(56) References Cited

U.S. PATENT DOCUMENTS 10,277,322 B2 4/2019 Dogiamis et al.
2002/0041637 A1* 4/2002 Smart ................ H04L 27/2602
375/316

(Continued)

FOREIGN PATENT DOCUMENTS

| EP | 2395598 A1 | 12/2011 |
| EP | 3203287 A1 | 8/2017 |
| WO | 2016209375 A1 | 12/2016 |

OTHER PUBLICATIONS

Rodolfo Gomes, Luis Sismeiro, Carlos Ribeiro, Telmo R. Fernades, Manuel Garcia Sanchez, Akram Hammoudeh, Rafael F. S. Caldeirinha, "Will COTS RF Front-Ends Really Cope With 5G Requirements at mmWave?", IEEE, Jul. 2018 (Year: 2018).*

(Continued)

*Primary Examiner* — Aristocratis Fotakis

(57) ABSTRACT

A millimeter-wave communication system includes a transmitter and a receiver. The transmitter is configured to be connected to a waveguide that is transmissive at millimeter-wave frequencies, the waveguide having a propagation parameter that varies with frequency at the millimeter-wave frequencies. The transmitter is configured to generate a millimeter-wave signal comprising multiple sub-carriers that are modulated with data, wherein each sub-carrier is modulated with a respective portion of the data and is subjected to only a respective fraction of a variation in the propagation parameter, and to transmit the millimeter-wave signal into a first end of the waveguide. The receiver is configured to receive the millimeter-wave signal from a second end of the waveguide, and to extract the data from the multiple sub-carriers.

20 Claims, 5 Drawing Sheets

(56) References Cited

U.S. PATENT DOCUMENTS

| | | | |
|---|---|---|---|
| 2004/0081263 A1* | 4/2004 | Lee | H04L 1/0606 375/347 |
| 2004/0202234 A1* | 10/2004 | Wang | H04L 27/266 375/149 |
| 2005/0084042 A1* | 4/2005 | Van Houtum | H04L 27/2613 375/346 |
| 2008/0212698 A1* | 9/2008 | Kim | H04L 5/0007 375/260 |
| 2011/0170494 A1* | 7/2011 | Kim | H04W 56/0015 370/328 |
| 2013/0139597 A1* | 6/2013 | Lin | G01H 9/00 73/584 |
| 2014/0241444 A1* | 8/2014 | Li | H04L 1/0041 375/260 |
| 2014/0285277 A1 | 9/2014 | Herbsommer et al. | |
| 2015/0295300 A1 | 10/2015 | Herbsommer et al. | |
| 2015/0372388 A1* | 12/2015 | Martineau | H01Q 13/06 343/785 |
| 2016/0249398 A1* | 8/2016 | Yankevich | H04W 28/06 |
| 2017/0018831 A1 | 1/2017 | Henry et al. | |
| 2017/0059356 A1 | 3/2017 | Kallman et al. | |
| 2018/0040936 A1 | 2/2018 | Yoshimoto et al. | |
| 2018/0054800 A1* | 2/2018 | Yeo | H04W 72/08 |
| 2018/0323825 A1* | 11/2018 | Cioffi | H04B 3/52 |
| 2020/0052947 A1* | 2/2020 | Sahin | H04L 27/2636 |
| 2020/0076040 A1* | 3/2020 | Dogiamis | H01P 3/16 |
| 2020/0092065 A1* | 3/2020 | Kuang | H04L 5/001 |
| 2020/0136726 A1* | 4/2020 | Tam | H04B 10/90 |
| 2020/0168972 A1* | 5/2020 | Dogiamis | B60R 11/04 |
| 2020/0380947 A1* | 12/2020 | Zafeiropoulos | G10K 11/17813 |

OTHER PUBLICATIONS

Yue Li, Liwen Jing, Zhao Li and Ross D. Murch, "Subcarrier Delay Spread Based Adaptive OFDM for Mobile Wideband Waveguide Channels", Hong Kong University of Science and Technology, IEEE, May 2018 (Year: 2018).*

Jiri Blumenstein; Ales Prokes; Josef Vychodil; Martin Pospisil; Tomas Mikulasek, "Time-varying K factor of the mm-Wave Vehicular Channel: Velocity, Vibrations and the Road Quality Influence", Brno University of Technology, Czech Republic, Oct. 8-13, 2017, IEEE (Year: 2017).*

Jiri Blumenstein, Josef Vychodil, Martin Pospisil, Tomas Mikulasek, Ales Prokes. "Effects of Vehicle Vibrations on mm-Wave Channel:Doppler Spread and Correlative Channel Sounding", Brno University of Technology, Czech Republic, Sep. 4-8, 2016, IEEE (Year: 2016).*

Satoshi Fukuda, Yasufumi Hino, Sho Ohashi, Takahiro Takeda, Hiroyuki Yamagishi, Satoru Shinke, Kenji Komori, Masahiro Uno, Yoshiyuki Akiyama, Kenichi Kawasaki, Ali Hajimiri, "A 12.5+12.5 GB/s Full-Duplex Plastic Waveguide Interconnect", IEEE Journal of Solid-State Circuits, Dec. 2011 (Year: 2011).*

Bruno et al., "Flexible Dielectric Waveguides with Powder Cores", IEEE Transactions on Microwave Theory and Techniques, vol. 36, No. 5, pp. 882-890, May 1988.

Rogers Corporation, "RO3000® Series Circuit Materials, RO3003™, RO3006™, RO3010™ and RO3035™ High Frequency Laminates", Datasheet, pp. 1-4, year 2018.

IEEE 802.3bw-2015—IEEE Standard for Ethernet Amendment 1: "Physical Layer Specifications and Management Parameters for 100 Mb/s Operation over a Single Balanced Twisted Pair Cable (100BASE-T1)", pp. 1-88, Oct. 2015.

DuPont™ Teflon, Fluoropolymer foam Resin FFR 880, 2 pages, year 2012.

Tam et al., U.S. Appl. No. 16/299,154, filed Mar. 12, 2019.

Tam et al., U.S. Appl. No. 16/258,731, filed Jan. 28, 2019.

Yeh et al., "The Essence of Dielectric Waveguides", Springer, Chapter 5, relevant pp. 155-160, Jun. 17, 2008.

International Application PCT/IB2019/050667 Search Report dated Jun. 6, 2019.

International Application PCT/IB2019/052647 Search Report dated Jun. 28, 2019.

Ahirwar et al., U.S. Appl. No. 16/370,999, filed Mar. 31, 21019.

Pasternack, "60 GHz Transmit/Receive (Tx/Rx) Development System, User Guide, PEM009-KIT," Rev 1.1, copyright 2014, downloaded Jun. 18, 2020 from https://www.pasternack.com/images/ProductPDF/PEM009-KIT.pdf, 21 pages.

* cited by examiner

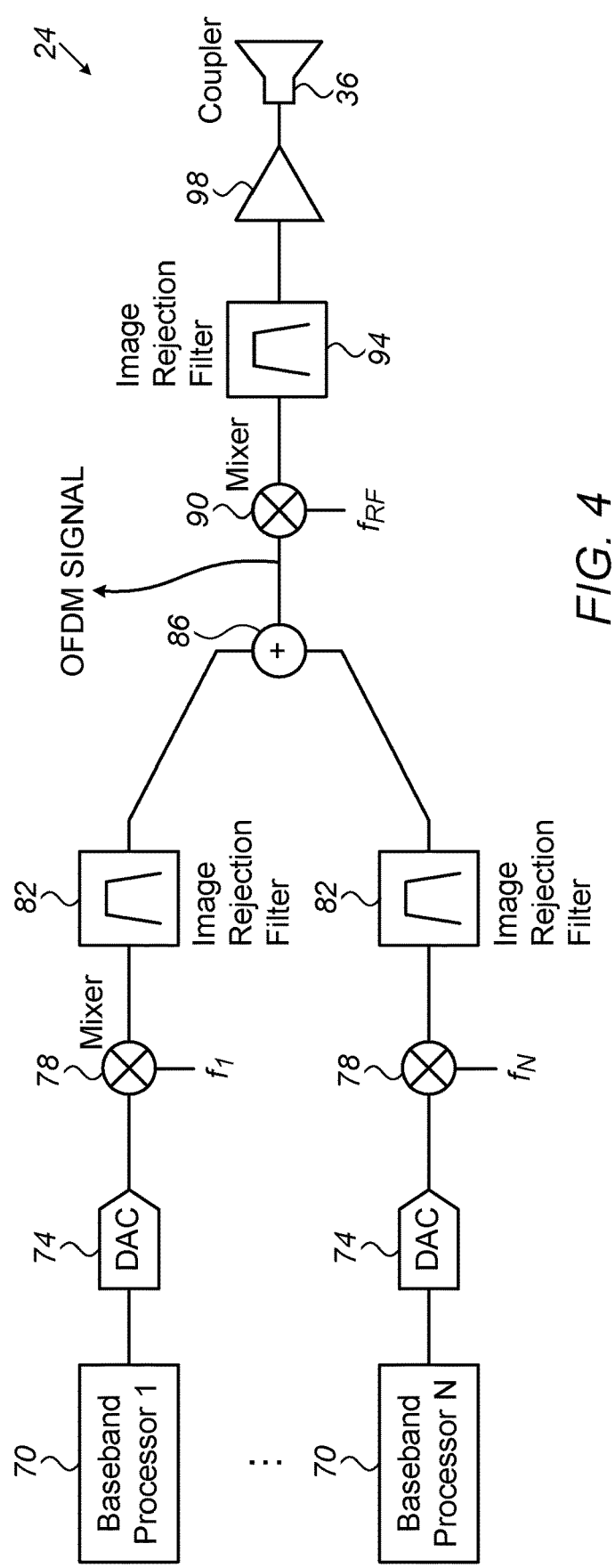
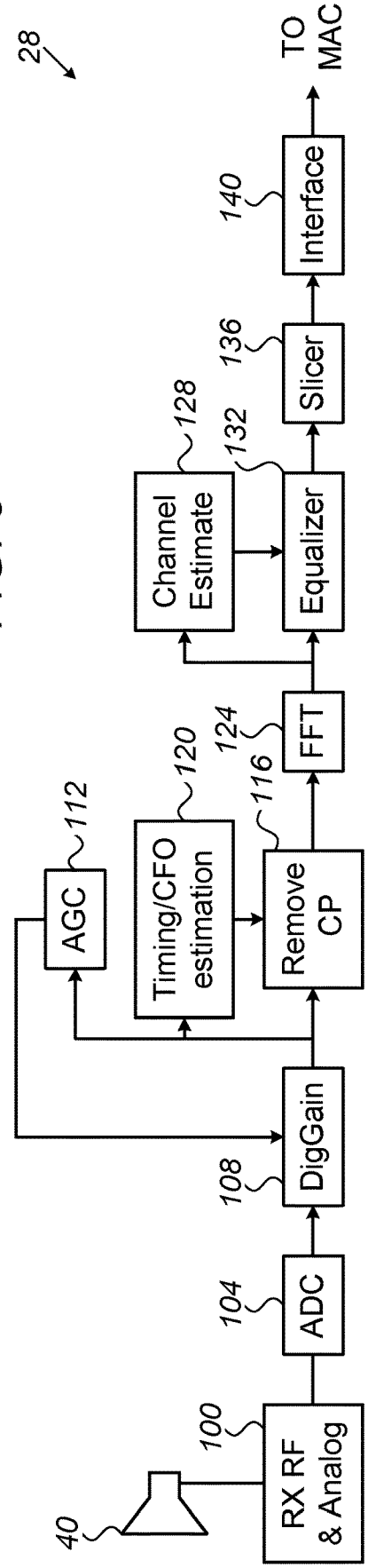
FIG. 4
FIG. 5

DISPERSION COMPENSATION IN MM-WAVE COMMUNICATION OVER PLASTIC WAVEGUIDE USING OFDM

CROSS-REFERENCE TO RELATED APPLICATIONS

This application claims the benefit of U.S. Provisional Patent Application 62/772,451, filed Nov. 28, 2018, whose disclosure is incorporated herein by reference.

FIELD OF THE DISCLOSURE

The present disclosure relates generally to communication systems, and particularly to methods and systems for millimeter-wave communication over waveguides, e.g., in motor vehicles.

BACKGROUND

Various applications, such as automotive in-car communication systems, certain industrial communication systems and smart-home systems, require communication at high data rates over relatively small distances. Several types of protocols and communication media have been proposed for such applications.

The description above is presented as a general overview of related art in this field and should not be construed as an admission that any of the information it contains constitutes prior art against the present patent application.

SUMMARY

An embodiment that is described herein provides a millimeter-wave communication system including a transmitter and a receiver. The transmitter is configured to be connected to a waveguide that is transmissive at millimeter-wave frequencies. The waveguide has a propagation parameter that varies with frequency at the millimeter-wave frequencies, and the transmitter is configured to generate a millimeter-wave signal comprising multiple sub-carriers that are modulated with data, wherein each sub-carrier is modulated with a respective portion of the data and is subjected to only a respective fraction of a variation in the propagation parameter, and to transmit the millimeter-wave signal into a first end of the waveguide. The receiver is configured to receive the millimeter-wave signal from a second end of the waveguide, and to extract the data from the multiple sub-carriers.

In some embodiments, the variation in the propagation parameter causes a delay spread, and the transmitter is configured to generate the millimeter-wave signal with guard intervals that are larger than the delay spread. In some embodiments, the transmitter is configured to modulate the data onto the sub-carriers using Orthogonal Frequency Division Multiplexing (OFDM).

In an embodiment, the propagation parameter includes a propagation velocity at the millimeter-wave frequencies, and the transmitter is configured to generate the millimeter-wave signal with each sub-carrier subjected to only a respective fraction of the variation in the propagation velocity. Additionally or alternatively, the propagation parameter includes a complex gain at the millimeter-wave frequencies, and the transmitter is configured to generate the millimeter-wave signal with each sub-carrier subjected to only a respective fraction of the variation in the complex gain.

In an example embodiment, the waveguide includes one or more in-line connectors, and the receiver is configured to extract the data from the multiple sub-carriers while compensating for variations in the complex gain caused by the one or more in-line connectors. In an embodiment, the receiver includes an adaptive equalizer that is configured to compensate for variations in the complex gain.

There is additionally provided, in accordance with an embodiment that is described herein, a method for millimeter-wave communication. The method includes, in a transmitter, which is connected to a first end of a waveguide that is transmissive at millimeter-wave frequencies, the waveguide having a propagation parameter that varies with frequency at the millimeter-wave frequencies, generating a millimeter-wave signal comprising multiple sub-carriers that are modulated with data and, wherein each sub-carrier is modulated with a respective portion of the data and is subjected to only a respective fraction of a variation in the propagation parameter. The millimeter-wave signal is transmitted into the first end of the waveguide. In a receiver, which is connected to a second end of the waveguide, the millimeter-wave signal is received and the data is extracted from the multiple sub-carriers.

The present disclosure will be more fully understood from the following detailed description of the embodiments thereof, taken together with the drawings in which:

BRIEF DESCRIPTION OF THE DRAWINGS

FIG. 4 is a block diagram that schematically illustrates an OFDM transmitter for coupling to a plastic waveguide, in accordance with an embodiment that is described herein;

FIG. 5 is a block diagram that schematically illustrates an OFDM receiver for coupling to a plastic waveguide, in accordance with an embodiment that is described herein;

DETAILED DESCRIPTION OF EMBODIMENTS

Automotive, industrial and smart-home environments are typically characterized by severe noise, demanding Electro-Magnetic Compatibility (EMC) requirements and limited space, and at the same time require communication at high data rates, high reliability and low cost. One attractive solution in such environments is millimeter-wave (mm-wave) communications over waveguides, e.g., waveguides made of suitable plastic materials.

The use of mm-wave waveguides is addressed, for example, in U.S. patent application Ser. No. 16/258,731, filed Jan. 28, 2019, entitled "MM-Wave Waveguide Physical Layer Interconnect for Automotive and Industrial Networks," and in U.S. patent application Ser. No. 16/370,999, entitled "Plastic MM-Wave Waveguide with Integral Electrically-Conductive Transmission Line," filed Mar. 31, 2019, which are both assigned to the assignee of the present patent application and whose disclosures are incorporated herein by reference.

Figure 3:
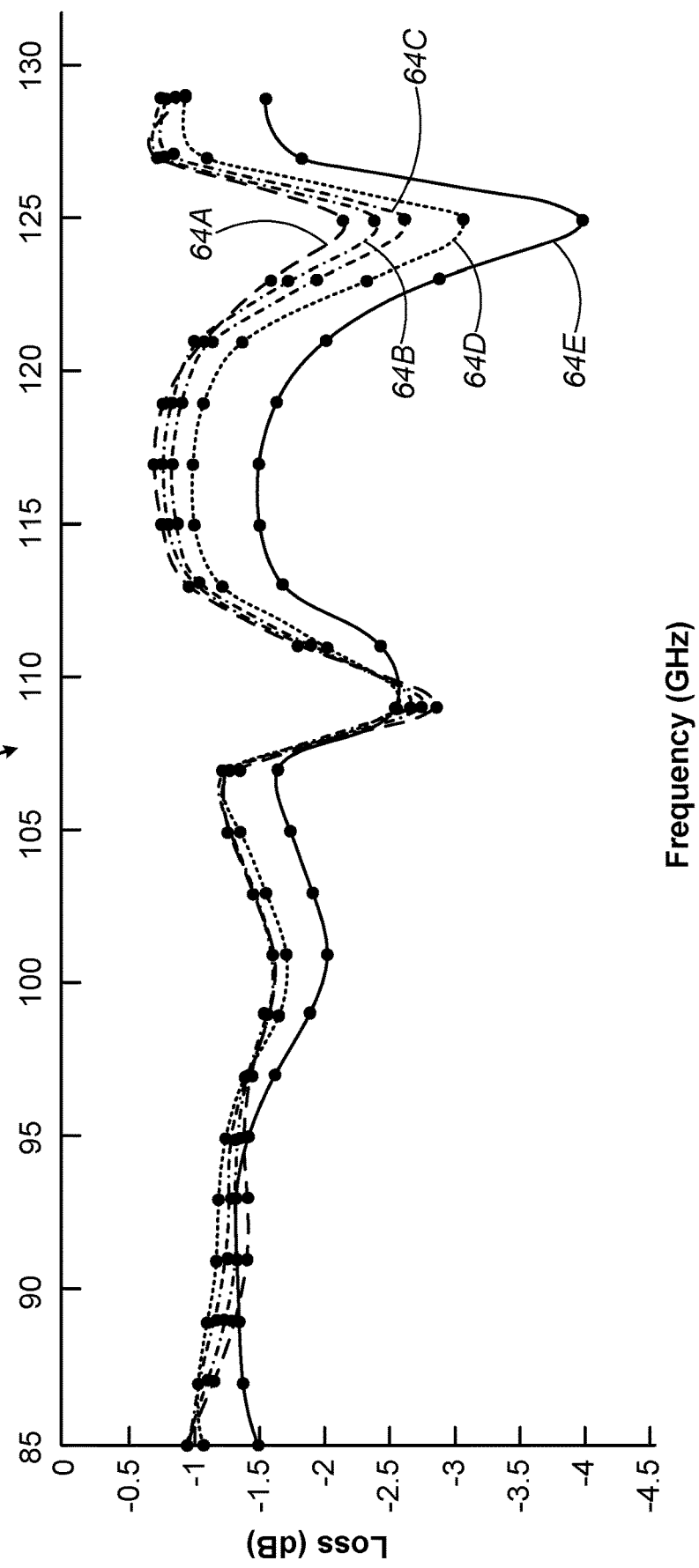
FIG. 3 is a graph showing the insertion loss of an in-line connector as a function of frequency, in accordance with an embodiment that is described herein.

Although highly attractive in terms of cost, manufacturability and ease of installation, the electromagnetic propagation characteristics of mm-wave waveguides pose a difficult challenge for transmission of broadband signals. In many practical cases, the propagation parameters (e.g., propagation velocity, also referred to as group velocity, and/or complex gain, i.e., insertion loss and insertion phase) of a plastic waveguide vary significantly as a function of frequency at mm-wave frequencies. A typical real-life example is shown in FIG. 3 below. Proper compensation for such variations is critical for reliable communication at high data rates, e.g., 1 Gbps and above.

Consider, for example, a 15-meter long solid Teflon® waveguide of 1 mm radius. At a center frequency of 90 GHz, this waveguide typically exhibits a delay spread of ~0.7 nSec and a coherent bandwidth of ~1.5 GHz. Unless accounted for, this sort of delay spread and coherent bandwidth render the waveguide useless for broadband transmission.

At mm-wave frequencies, the variation in propagation velocity as a function of frequency tends to be dominated by waveguide dispersion—Dispersion due to the waveguide geometry, e.g., the percentage of energy travelling in air vs. the percentage of energy travelling in plastic. Other mechanisms, e.g., polarization dispersion, multi-mode dispersion and material dispersion, have a considerably weaker effect. Further details regarding these impairments are given in U.S. Provisional Patent Application 62/772,451, cited above.

The above-described propagation characteristics are unique to waveguides (e.g., plastic waveguides) at mm-wave frequencies, as opposed, for example, to dispersion exhibited by optical fibers at optical wavelengths. Solutions that enable broadband optical communication over optical fibers are therefore generally unsuitable for mm-wave communication over plastic waveguides.

Embodiments that are described herein provide improved methods and apparatus for broadband communication at mm-wave frequencies over plastic waveguides. In the context of the present disclosure and in the claims, the term "millimeter-wave signal" refers to a signal whose wavelength is roughly in the range of 1 mm-10 mm, although the disclosed techniques are suitable for use at higher or lower frequencies, as well.

In some embodiments, a mm-wave communication system comprises a transmitter and a receiver coupled to a waveguide that is transmissive at mm-wave frequencies. The waveguide has a propagation parameter (e.g., propagation velocity and/or complex gain) that varies with frequency over the mm-wave frequency band being used.

In the disclosed embodiments, instead of modulating data over a single carrier (which would result in a mm-wave signal that will be severely distorted by the waveguide) the transmitter is configured to generate a mm-wave signal comprising multiple sub-carriers that are modulated with respective portions of the total data to be transmitted. With this signal configuration, each sub-carrier is subjected only to a small fraction of the overall variation is propagation parameter (e.g., dispersion). In examples, the waveguide dispersion defines a bandwidth of the subcarrier. Further, a number of the subcarriers is defined by the waveguide dispersion of the plastic waveguide and a carrier frequency offset of the transmitter.

By guaranteeing that the variation in propagation characteristics is sufficiently small within the bandwidth of each sub-carrier, the receiver is capable of successfully demodulating the data from the mm-wave signal. In other words, when demodulating a signal made of multiple sub-carriers, the demodulation performance does not depend on the variation in propagation characteristics across the entire signal bandwidth, but rather over each individual sub-carrier.

In various embodiments, the frequency spacing between sub-carriers is set to any suitable value. One important consideration is that the spacing between adjacent sub-carriers should be larger than the maximal expected Carrier Frequency Offset (CFO) at RF between the transmitter and receiver. At 90 GHz, for example, a CFO of 50 part-per-million (ppm) results in a frequency shift of 4.5 MHz. Thus, the spacing between adjacent sub-carriers should be larger than this shift.

In various embodiments, the symbol rate (and thus the bandwidth of each sub-carrier) is set to any suitable value. In practice, it is quite possible that different sub-carriers (not necessarily only adjacent sub-carriers) will overlap in the frequency domain. The high symbol rates result in signal dispersion or spreading, in accordance with the delay spread of the waveguide. In some embodiments, the transmitter generates guard intervals between successive OFDM symbols in order to resolve such spreading. In some embodiments, although not necessarily, the transmitter generates Cyclic Prefixes (CP) in the guard intervals. Typically, the length of the guard interval is set to be larger than the waveguide delay spread.

The disclosed techniques thus enable reliable communication of high data rates, e.g., several Gbps, over simple, low cost plastic waveguides at mm-wave frequencies, without approaching the dispersion limit of the waveguide. In an embodiment, the transmitter is configured to modulate the data onto the sub-carriers using Orthogonal Frequency Division Multiplexing (OFDM). In other embodiments, other modulation schemes having multiple sub-carriers are used.

In some embodiments, multiple waveguide sections are connected by one on more in-line connectors. The in-line connectors further increase the variation in propagation parameters as a function of frequency. In some embodiments, by using the disclosed technique, the receiver is configured to extract the data from the multiple sub-carriers successfully, while compensating for the increased variation caused by the in-line connectors, as well.

Figure 1:
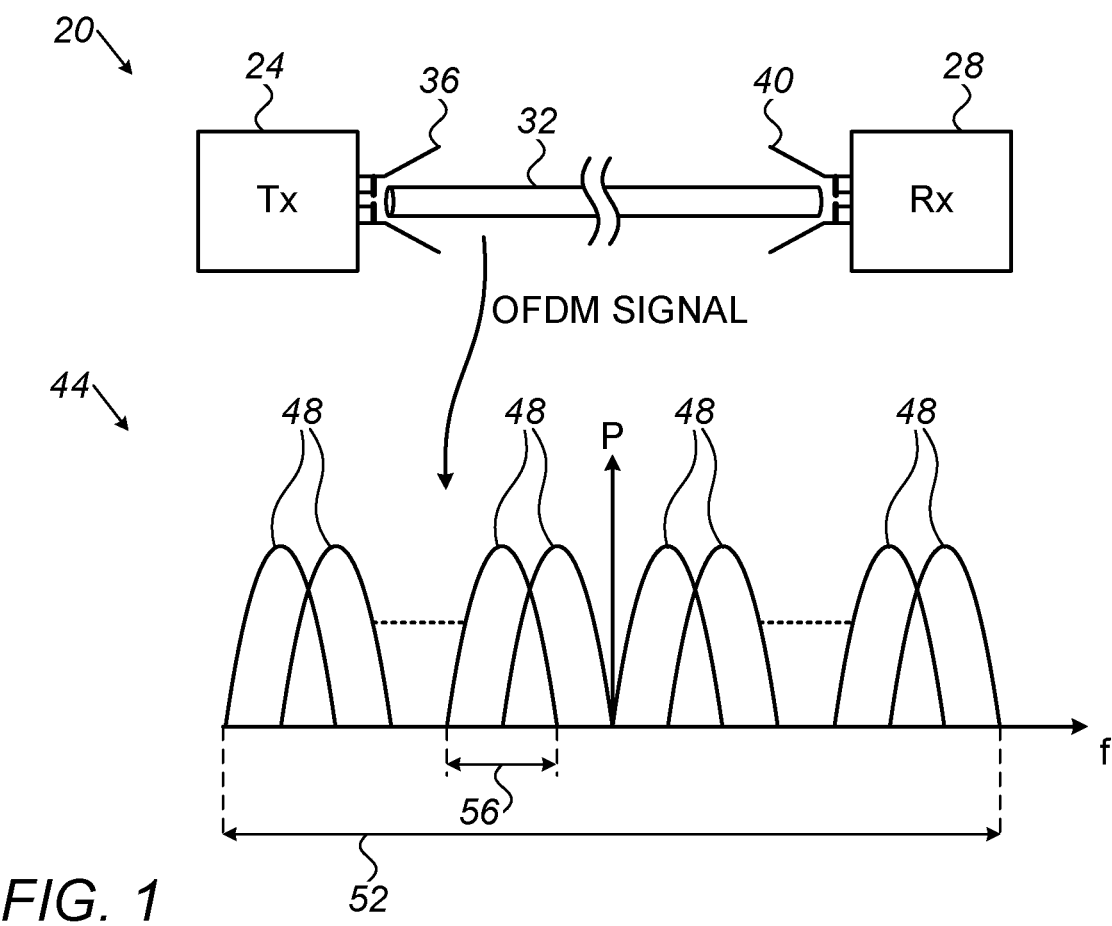
FIG. 1 is a block diagram that schematically illustrates a communication system that communicates over a plastic waveguide using Orthogonal Frequency Division Multiplex (OFDM) signals, in accordance with an embodiment that is described herein.

FIG. 1 is a block diagram that schematically illustrates a communication system 20, in accordance with an embodiment that is described herein. In an example embodiment, system 20 is used in an automotive communication network, for in-car networking in a motor vehicle. In another embodiment, system 20 is used for data communication in an industrial plant. Alternatively, the disclosed techniques are applicable in any other suitable application or environment.

In the present example, system 20 comprises a transmitter 24 and a receiver 28 that communicate over a plastic waveguide 32. Transmitter 24 generates a mm-wave signal that carries data, and transmits the signal into one end of waveguide 32 using a coupler 36. At the other end of waveguide 32, receiver 28 receives the mm-wave signal using a coupler 40, and demodulates the received signal so as to extract the data carried on the mm-wave signal.

In various embodiments, waveguide 32 may comprise any suitable material, e.g. a suitable plastic. Non-limiting example materials comprise fluoropolymers such as Polytetrafluoroethylene (PTFE) or polyethylene (PE). Any suitable waveguide configuration (e.g., geometry, structure and material composition) can be used, such as, for example, configurations described in U.S. Provisional Patent Application 62/772,451 and U.S. patent application Ser. Nos. 16/258,731 and 16/370,999, cited and incorporated by reference above. Non-limiting example implementations of transmitter 24 and receiver 28 are depicted in FIGS. 4 and 5 below, respectively.

In an example embodiment, the data rate that transmitter 24 and receiver 28 are required to transfer is at least 1 Gbps, and the available bandwidth is on the order of several GHz in the 90 GHz band. The Carrier Frequency Offset (CFO) between transmitter 24 and receiver 28 is on the order of 50 ppm. Waveguide 32 in this example, however, is highly dispersive at mm-wave frequencies. In an example embodiment, waveguide 32 is fifteen meters long, and the delay spread of waveguide 32 is on the order of ~0.7 nSec.

In an embodiment, in order to enable communication at the required data rate over such a highly dispersive waveguide, system 20 uses an Orthogonal Frequency Division Multiplex (OFDM) signal 44, as illustrated at the bottom of FIG. 1. OFDM signal 44 comprises multiple sub-carriers 48. Each sub-carrier 48 has a respective sub-carrier bandwidth 56. OFDM signal 44 as a whole occupies a total bandwidth 52. In various embodiments, each sub-carrier 48 is modulated with data using Binary Phase Shift Keying (BPSK), Quaternary Phase Shift Keying (QPSK), 16-point Quadrature Amplitude Modulation (16-QAM), 64-point QAM (64-QAM) or 256-point QAM (256-QAM), for example.

In example embodiments, total bandwidth 52 is 2 GHz, and the number of sub-carriers is set to 64, 128, 256 or 512. In example embodiments, the sub-carrier spacing (i.e., the frequency offset between the center frequencies of adjacent sub-carriers) is set to 31.25 MHz, 15.625 MHz, 7.8125 MHz or 3.90625 MHz. In an embodiment, for a CFO of 50 ppm at 90 GHz (i.e., CFO=4.5 MHz), the sub-carrier spacing is set to at least 7.8125 MHz, which translates into an OFDM symbol duration of 128 nSec. Assuming a sub-carrier spacing of 7.8125 MHz, for total bandwidths 52 of 500 MHz, 1 GHz and 4 GHz, the corresponding numbers of sub-carriers are 64, 128, 256 and 512, respectively. Example design considerations that enable selection of such parameters are given in U.S. Provisional Patent Application 62/772,451, cited above. Alternatively, however, any other suitable numerical values can be used.

In an example embodiment, another signal (not shown) is transmitted via waveguide 32 in the opposite direction, e.g., from another transmitter (not shown) collocated with receiver 28 to another receiver (not shown) collocated with transmitter 24. The two signals may comprise, for example, downlink and uplink signals of a communication connection. In an example embodiment, the uplink and downlink signals are separated by at least 6 GHz for operating in Frequency Division Duplex (FDD). In an example implementation, the downlink signal has a center frequency of 90 GHz and a maximum bandwidth of 4 GHz (i.e., occupies the band of 88-92 GHz), and the uplink signal has a center frequency of 96 GHz and a maximum bandwidth of 4 GHz (i.e., occupies the band of 94-98 GHz). Alternatively, any other suitable numerical values can be used.

In an embodiment, one or more sub-carriers in the vicinity of f=0 (DC) are not populated, in order to avoid the impact of DC leakage or other DC impairments in transmitter 24 and/or in receiver 28. In an embodiment, one or more pilot signals are included in at least some of the OFDM symbols of signal 44, for assisting timing, phase and/or frequency tracking in receiver 28. In an embodiment, one or more sub-carriers at the high and/or low edges of bandwidth 52 are configured to meet regulatory spectrum requirements, e.g., a specified spectral mask.

In some embodiments, a prefix is added to each OFDM symbol of signal 44. In an embodiment, the prefix is a zero-prefix (ZP), i.e., a zero-power time interval between successive OFDM symbols. In another embodiment the prefix is a cyclic-prefix (CP). In yet other embodiments, no prefix is used between OFDM symbols.

Several detailed examples of OFDM sub-carrier maps for various bandwidths, mapping of bits to constellation points and the like are given in U.S. Provisional Patent Application 62/772,451, cited above, which is incorporated by reference. It is noted, however, that all the configurations and numerical values given herein are depicted solely by way of example. In alternative embodiments, any other suitable configurations and values can be used.

In some embodiments, waveguide 32 is divided into multiple sections that are connected to one another by in-line connectors. In-line connectors are used, for example, in automotive systems in which different parts of a vehicle comprise respective sections of waveguide 32, and the sections are connected to one another during assembly of the vehicle.

Figure 2:
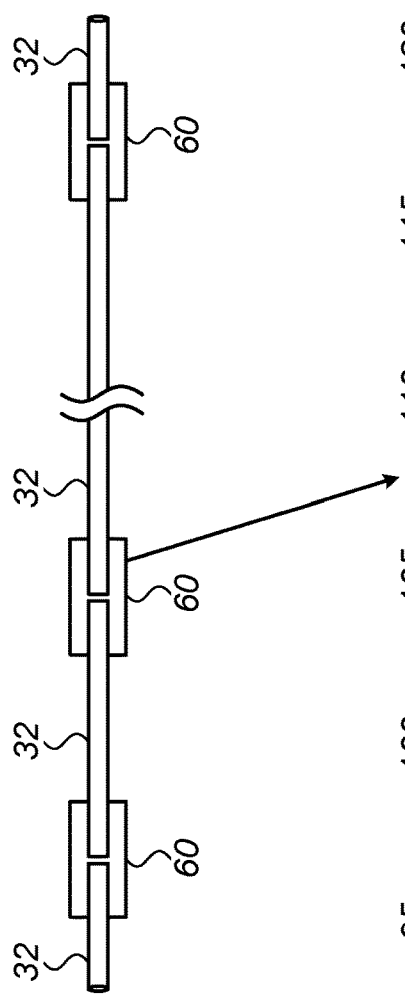
FIG. 2 is a diagram that schematically illustrates multiple sections of a plastic waveguide interconnected by in-line connectors, in accordance with an embodiment that is described herein.

FIG. 2 is a diagram that schematically illustrates multiple sections of plastic waveguide 32 interconnected by in-line connectors 60, in accordance with an embodiment that is described herein. The present example shows three waveguide sections and two in-line connectors, but generally, any suitable numbers of sections and connectors can be used between a transmitter and a receiver.

Although in-line connectors 60 are useful, for example, for simplifying assembly and installation, they have an adverse effect on the propagation characteristics of waveguide 32. Ideally, an in-line connector aims to couple the ends of the waveguide sections as closely together as possible, and to minimize any discontinuity in the waveguide material.

In practice, some residual discontinuity will always remain, e.g., due to air gaps or other imperfect interface between the waveguide sections. Discontinuities of this sort distort the spectral response of waveguide 32 (the insertion loss and insertion phase as a function of frequency) typically making the response highly frequency-selective with deep spectral notches. The distortion becomes even more severe when multiple in-line connectors 60 are present.

FIG. 3 is a graph showing example simulation results of the insertion loss of an in-line connector 60 as a function of frequency, in accordance with an embodiment that is described herein. The figure demonstrates the insertion loss of a single in-line connector 60 as a function of frequency. The figure focuses on the absolute magnitude of the complex insertion loss, for the sake of clarity. Typically, however, the insertion phase (i.e., the phase of the complex insertion loss) varies considerably (and non-linearly) as a function of frequency, as well.

The example connector used in the simulation has a 10 mm long dielectric and a 5 mm long metal shield. A plot 64A shows the insertion loss for metal shield only. Plots 64B, 64C, 64D and 64E show the insertion loss for air gaps of 50μ, 100μ, 200μ and 400μ, respectively. As seen, as the air gap grows, the insertion loss becomes more frequency-selective and the spectral notches become steeper and deeper.

A frequency-selective insertion loss such as shown in FIG. 3 would cause severe distortion to a broadband signal, e.g., a single modulated carrier spanning several GHz. However, when using the disclosed signals that comprise multiple sub-carriers (e.g., signal 44 of FIG. 1), each individual sub-carrier 48 traverses a relatively flat channel. In-line connector 60 will typically cause different attenuations in different sub-carriers due to the frequency-selective insertion loss, but the attenuation will be flat within the bandwidth of any individual sub-carrier. Such a flat attenuation causes little or no Inter-Symbol-Interference (ISI), and is considerably simpler to correct in receiver 28, e.g., using an adaptive equalizer.

FIG. 4 is a block diagram that schematically illustrates an example implementation of OFDM transmitter 24 of system 20, in accordance with an embodiment that is described herein. In the present example, transmitter 24 comprises N signal-generation chains (seen on the left-hand side of the figure), each configured to generate a respective sub-carrier 48 of OFDM signal 44. The number of signal-generation chains, N, is thus equal to the number of sub-carriers. In an embodiment, each signal-generation chain comprises a baseband processor 70, a Digital-to-Analog Converter (DAC) 74, an IF mixer 78 and an image-rejection filter 82.

In each signal-generation chain, baseband processor 70 generates a digital signal comprising a sub-carrier modulated with a respective portion of the overall data to be transmitted. DAC 74 converts the digital signal into an analog baseband signal. Mixer 78 up-converts the analog baseband signal to a suitable Intermediate Frequency (IF), according to the desired frequency of the sub-carrier within the bandwidth of the OFDM signal. The N mixers 78 are provided with N local-oscillator signals having frequencies $f_1 \ldots f_N$ for this purpose. The IF signal at the output of each mixer 78 is filtered by the respective image-rejection filter 82, in an embodiment, to remove unwanted signal components such as an image of the preceding mixer's LO signal.

An analog combiner 86 combines the filtered IF signals produced by the N signal-generation chains. The output of combiner 86 thus comprises an analog OFDM signal at IF. The analog OFDM signal comprises the N sub-carriers, each sub-carrier positioned at its designated frequency. An RF mixer 90 up-converts the signal to the desired mm-wave frequency, e.g., in the 90 GHz band. An image-rejection filter 94 filters the signal to remove unwanted signal components such as an image of the preceding mixer's LO signal. A Power Amplifier (PA) 98 amplifies the signal. The amplified mm-wave signal (which comprises the multiple sub-carriers, each carrying a respective portion of the overall data) is then provided to coupler 36 for transmission into waveguide 32 (see FIG. 1).

FIG. 5 is a block diagram that schematically illustrates an example implementation of OFDM receiver 28 of system 20, in accordance with an embodiment that is described herein. In the present implementation of receiver 28, an RF and analog Front End 100 receives OFDM signal 44 from coupler 40 (see FIG. 1). An Analog-to-Digital Converter (ADC) 104 digitizes the received OFDM signal and outputs a digital baseband signal.

In an embodiment, a digital gain block 108 applies a controllable gain to the signal. The gain applied by block 108 is set by an Automatic Gain Control (AGC) module 112, based on the signal level at the output of block 108. A timing/frequency estimation module 120 estimates the timing offset and Carrier Frequency Offset (CFO) of the received signal, and outputs suitable correction signals. A Cyclic Prefix (CP) removal block corrects the timing and CFO offsets using the correction signals, and removes the CP from each OFDM symbol.

A Fast Fourier Transform (FFT) block 124 applies FFT to the digital baseband signal. A channel estimator 128 estimates the channel response of waveguide (including in-line connectors if present). An adaptive equalizer 132 compensates for the channel response based on the output of channel estimator 128. In an embodiment, adaptive equalizer 132 comprises a digital filter having programmable coefficients ("taps"). Channel estimator 128 calculates suitable coefficients that compensate for (e.g., invert) the estimated response of waveguide 32 (including in-line connectors if present), and programs adaptive equalizer 32 with the coefficients.

In an embodiment, a slicer 136 receives the equalized signal and outputs bit decisions, i.e., decides which are the bit values that are most likely to have been transmitted in the equalized signal. The slicing operation thus extracts the data values from the signal. An interface 140 formats the data and outputs the data to upper layers, e.g., to a Medium Access Control (MAC) processor. Generally speaking, receiver 28 applies symbol-level and bit-level processing. Upper layers are aware of higher-level constructs such as code words and packets, various protocol-related control tasks retransmission. The plastic waveguide in automotive applications will be a rapidly changing channel due to mechanical vibration. In examples, a channel estimation of the plastic waveguide is determined in response to mechanical vibrations in an automobile and a duration of a payload packet of the millimeter-wave signal is selected to be less than a coherence time of the plastic waveguide defined by the mechanical vibrations in the automobile.

Figure 6:
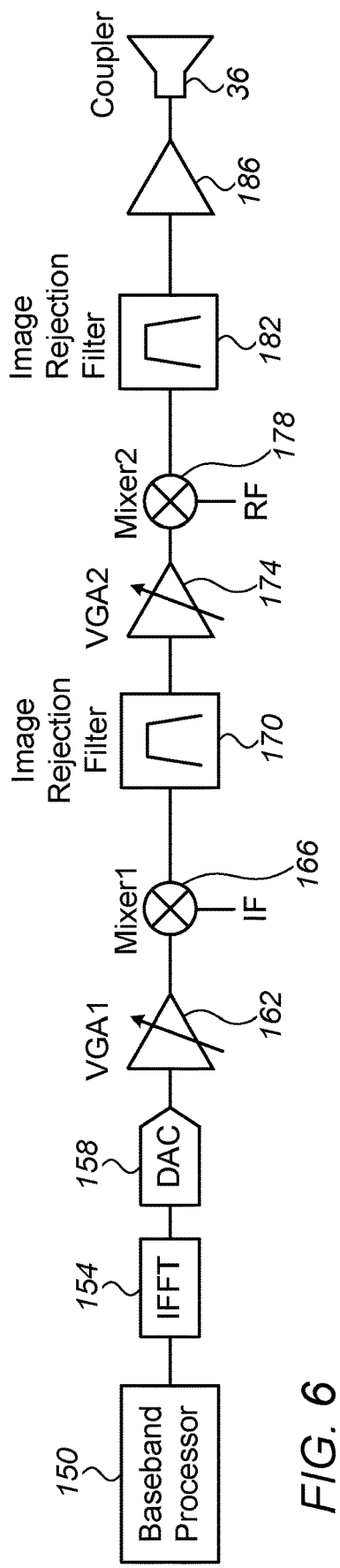
FIG. 6 is a block diagram that schematically illustrates an OFDM transmitter for coupling to a plastic waveguide, in accordance with an alternative embodiment that is described herein.

FIG. 6 is a block diagram that schematically illustrates an OFDM transmitter for coupling to a plastic waveguide, in accordance with an alternative embodiment that is described herein. In an embodiment, the configuration of FIG. 6 is used for implementing OFDM transmitter 24 of system 20.

In contrast, for example, to the OFDM transmitter of FIG. 4 above, in the embodiment of FIG. 6 a single baseband processor 150 generates the entire OFDM signal including all sub-carriers. An Inverse FFT (IFFT) block 154 transforms the baseband signal to the time domain by applying IFFT. A DAC 158 converts the signal to an analog baseband signal. A Variable-Gain Amplifier 162 (denoted VGA1) amplifies the analog baseband signal. The gain of VGA 162 may set according to any suitable criterion.

An IF mixer 166 (denoted Mixer1) up-converts the analog baseband signal to IF. An image-rejection filter 170 filters the IF signal to remove unwanted signal components such as an image of the preceding mixer's LO signal. A Variable-Gain Amplifier 174 (denoted VGA2) amplifies the analog baseband signal. The gain of VGA 174 may set according to any suitable criterion.

An RF mixer 178 (denoted Mixer2) up-converts the IF signal to RF. An image-rejection filter 182 filters the RF signal to remove unwanted signal components such as an image of the preceding mixer's LO signal. A PA 186 amplifies the RF signal. The RF signal is provided to coupler 36 for transmission into waveguide 32.

Figure 7:
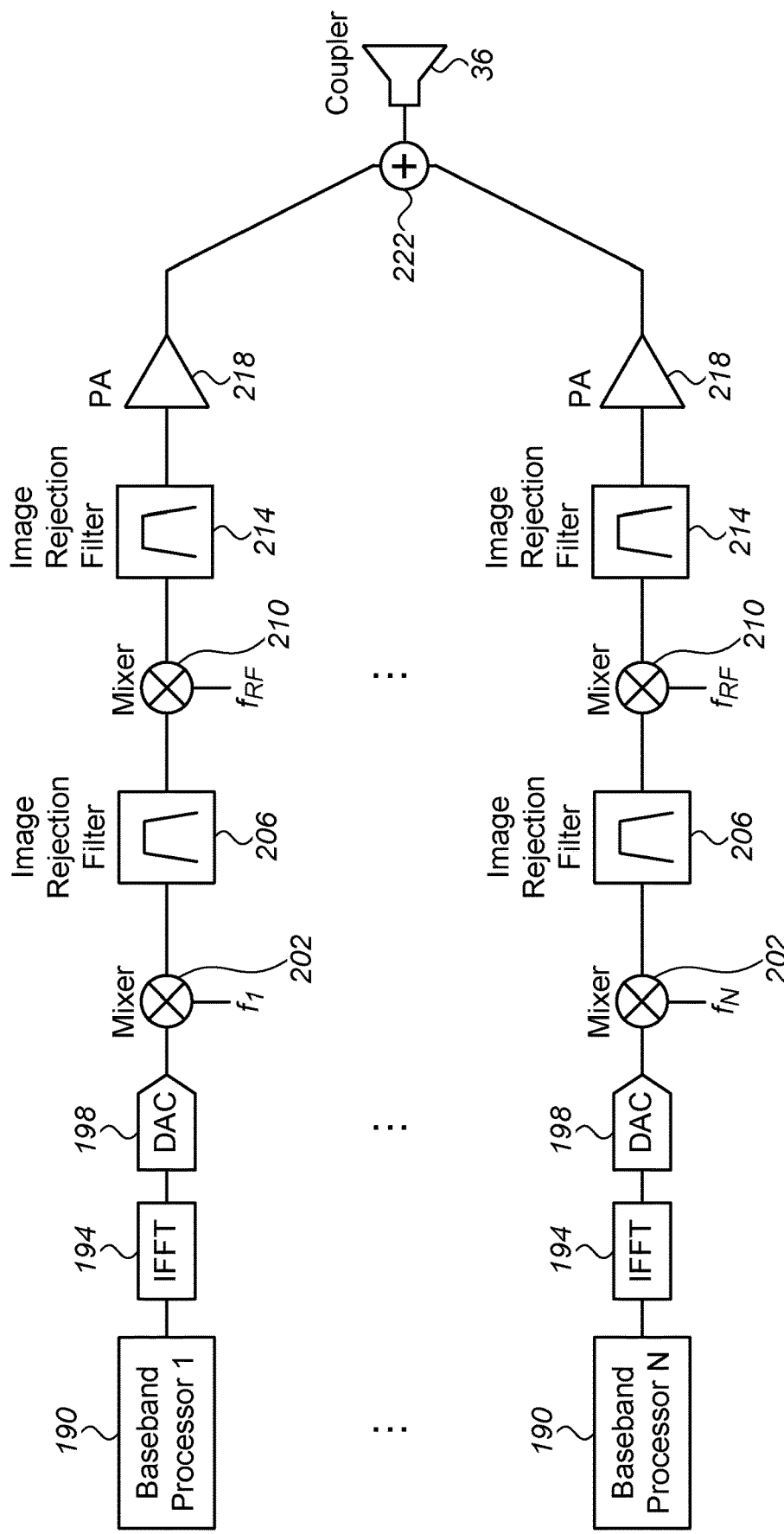
FIG. 7 is a block diagram that schematically illustrates an OFDM transmitter for coupling to a plastic waveguide, in accordance with an alternative embodiment that is described herein.

FIG. 7 is a block diagram that schematically illustrates an OFDM transmitter for coupling to a plastic waveguide, in accordance with another alternative embodiment that is described herein. In an embodiment, the configuration of FIG. 7 is used for implementing OFDM transmitter 24 of system 20.

The embodiment of FIG. 7 is similar to the embodiment of FIG. 4 above in the sense that the multiple sub-carriers are generated by separate signal-generation chains, and later combined to form the OFDM signal. In FIG. 4, however, the combining is performed at IF, whereas in FIG. 7 the combining is performed at RF, immediately before coupler 36.

In the example of FIG. 7, the OFDM transmitter comprises N signal-generation chains, each configured to generate a respective sub-carrier 48 of OFDM signal 44. The number of signal-generation chains, N, is thus equal to the number of sub-carriers. In an embodiment, each signal-generation chain comprises a baseband processor 190, an IFFT block 194, a DAC 198, an IF mixer 202, an image-rejection filter 206, an RF mixer 210, an image-rejection filter 214 and a PA 218.

In each signal-generation chain, baseband processor 190 generates a digital signal comprising a sub-carrier modulated with a respective portion of the overall data to be transmitted. IFFT block 194 applies IFFT to the digital signal. DAC 198 converts the digital signal into an analog baseband signal. Mixer 202 up-converts the analog baseband signal to IF, according to the desired frequency of the sub-carrier within the bandwidth of the OFDM signal. The IF signal at the output of each mixer 202 is filtered by the respective image-rejection filter 206, to remove unwanted signal components such as an image of the preceding mixer's LO signal. RF mixer 210 up-converts the signal to RF. Image-rejection filter 214 filters the signal to remove unwanted signal components such as an image of the preceding mixer's LO signal. PA 218 amplifies the RF signal.

In an embodiment, an RF combiner 222 combines the RF signals produced by the N signal-generation chains. The output of combiner 222 thus comprises an analog OFDM signal at RF. The amplified mm-wave signal (which comprises the multiple sub-carriers, each carrying a respective portion of the overall data) is then provided to coupler 36 for transmission into waveguide 32.

The transmitter and receiver configurations of FIGS. 4-7 are depicted solely by way of example. In alternative embodiments, any other suitable transmitter or receiver configuration can be used. Several alternative configurations are presented in U.S. Provisional Patent Application 62/772,451, cited above.

The various elements of the various implementations of transmitter 24 and receiver 28 may be implemented using dedicated hardware or firmware, such as hard-wired or programmable components, e.g., in one or more Application-Specific Integrated Circuits (ASICs), Field-Programmable Gate Arrays (FPGAs) or RF Integrated Circuits (RFICs), using software, or using a combination of hardware and software elements.

Although the embodiments described herein mainly address automotive networks, the methods and systems described herein can also be used in other applications, such as in transmission of network data in other environments, e.g., in industrial networks.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A millimeter-wave communication system in an automobile, comprising:
   a transmitter in the automobile, configured to be connected to a first end of a plastic waveguide in the automobile that is transmissive at millimeter-wave frequencies, the plastic waveguide having a propagation parameter dominated by waveguide dispersion and that varies with frequency at the millimeter-wave frequencies, the transmitter configured to generate a millimeter-wave signal comprising multiple sub-carriers that are modulated with data, wherein each sub-carrier is modulated with a respective portion of the data and is subjected to only a respective fraction of a variation in the propagation parameter, wherein a number of the subcarriers is defined by the waveguide dispersion of the plastic waveguide and a carrier frequency offset of the transmitter, and to transmit the millimeter-wave signal into the first end of the plastic waveguide; and
   a receiver in the automobile, configured to be connected to a second end of the plastic waveguide in the automobile, to receive the millimeter-wave signal from the second end of the plastic waveguide, and to extract the data from the multiple sub-carriers;
   wherein a channel estimation dynamically estimates a channel response of the plastic waveguide and of in-line connectors in response to mechanical vibrations in the automobile, wherein the plastic waveguide is connected between the transmitter and the receiver and the in-line connectors connect multiple plastic waveguide sections of the plastic waveguide, wherein an adaptive equalizer compensates the estimated channel response of the plastic waveguide and the in-line connectors based on the channel estimation, and wherein a duration of a payload packet of the millimeter-wave signal is selected to be less than a coherence time of the plastic waveguide.

2. The millimeter-wave communication system according to claim 1, wherein the variation in the propagation parameter causes a delay spread, and wherein the transmitter is configured to generate the millimeter-wave signal with guard intervals that are larger than the delay spread.

3. The millimeter-wave communication system according to claim 1, wherein the transmitter is configured to modulate the data onto the sub-carriers using Orthogonal Frequency Division Multiplexing (OFDM).

4. The millimeter-wave communication system of claim 3, wherein the data comprises OFDM symbols and no prefix is added between the OFDM symbols.

5. The millimeter-wave communication system of claim 3, wherein a spacing between adjacent subcarriers is greater than the carrier frequency offset.

6. The millimeter-wave communication system according to claim 1, wherein the propagation parameter comprises a propagation velocity at the millimeter-wave frequencies, and wherein the transmitter is configured to generate the millimeter-wave signal with each sub-carrier subjected to only a respective fraction of the variation in the propagation velocity.

7. The millimeter-wave communication system according to claim 1, wherein the propagation parameter comprises a complex gain at the millimeter-wave frequencies, and wherein the transmitter is configured to generate the millimeter-wave signal with each sub-carrier subjected to only a respective fraction of the variation in the complex gain.

8. The millimeter-wave communication system according to claim 7, wherein the receiver is configured to extract the data from the multiple sub-carriers while compensating for variations in the complex gain caused by the one or more in-line connectors.

9. The millimeter-wave communication system according to claim 7, changed to wherein the receiver comprises the adaptive equalizer that is configured to compensate for variations in the complex gain.

10. The millimeter-wave communication system of claim 1, wherein the waveguide dispersion defines a subcarrier bandwidth.

11. A method for millimeter-wave communication in an automobile, comprising:
 in a transmitter in the automobile, which is connected to a first end of a plastic waveguide in the automobile that is transmissive at millimeter-wave frequencies, the plastic waveguide having a propagation parameter dominated by waveguide dispersion that varies with frequency at the millimeter-wave frequencies, generating a millimeter-wave signal comprising multiple sub-carriers that are modulated with data and, wherein each sub-carrier is modulated with a respective portion of the data and is subjected to only a respective fraction of a variation in the propagation parameter, wherein a number of the subcarriers is defined by the waveguide dispersion of the plastic waveguide and a carrier frequency offset of the transmitter, and transmitting the millimeter-wave signal into the first end of the waveguide; and
 in a receiver in the automobile, which is connected to a second end of the plastic waveguide in the automobile, receiving the millimeter-wave signal and extracting the data from the multiple sub-carriers;
 wherein a channel estimation dynamically estimates a channel response of the plastic waveguide and of in-line connectors in response to mechanical vibrations in the automobile, wherein the plastic waveguide is connected between the transmitter and the receiver and the in-line connectors connect multiple plastic waveguide sections of the plastic waveguide, wherein an adaptive equalizer compensates the estimated channel response of the plastic waveguide and the in-line connectors based on the channel estimation, and wherein a duration of a payload packet of the millimeter-wave signal is selected to be less than a coherence time of the plastic waveguide.

12. The method according to claim 11, wherein the variation in the propagation parameter causes a delay spread, and wherein generating the millimeter-wave signal comprises inserting in the millimeter-wave signal guard intervals that are larger than the delay spread.

13. The method according to claim 11, wherein generating the millimeter-wave signal comprises modulating respective portions of the data onto the sub-carriers using Orthogonal Frequency Division Multiplexing (OFDM).

14. The method of claim 13, wherein the data comprises OFDM symbols and no prefix is added between the OFDM symbols.

15. The method of claim 13, wherein a spacing between adjacent subcarriers is greater than the carrier frequency offset.

16. The method according to claim 11, wherein the propagation parameter comprises a propagation velocity at the millimeter-wave frequencies, and wherein generating the millimeter-wave signal comprises subjecting each sub-carrier to only a respective fraction of the variation in the propagation velocity.

17. The method according to claim 11, wherein the propagation parameter comprises a complex gain at the millimeter-wave frequencies, and wherein generating the millimeter-wave signal comprises subjecting each sub-carrier to only a respective fraction of the variation in the complex gain.

18. The method according to claim 17, wherein extracting the data comprises compensating for variations in the complex gain caused by the one or more in-line connectors.

19. The method according to claim 17, wherein extracting the data comprises compensating for variations in the complex gain using the adaptive equalizer.

20. The method of claim 11, wherein the waveguide dispersion defines a subcarrier bandwidth.

* * * * *